United States Patent
Hung

(10) Patent No.: US 9,373,871 B2
(45) Date of Patent: Jun. 21, 2016

(54) BATTERY MODULE AND DETECTING METHOD THEREOF

(71) Applicant: ASUSTeK COMPUTER INC., Taipei (TW)

(72) Inventor: Ke-Jen Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 394 days.

(21) Appl. No.: 14/092,863

(22) Filed: Nov. 27, 2013

(65) Prior Publication Data

US 2014/0162098 A1    Jun. 12, 2014

(30) Foreign Application Priority Data

Dec. 12, 2012  (TW) .............................. 101146925 A

(51) Int. Cl.
*H01M 10/48*    (2006.01)
*H01M 2/02*    (2006.01)
*H01M 10/0525*    (2010.01)

(52) U.S. Cl.
CPC .............. *H01M 10/48* (2013.01); *H01M 2/028* (2013.01); *H01M 2/0285* (2013.01); *H01M 2/0287* (2013.01); *H01M 10/0525* (2013.01)

(58) Field of Classification Search
CPC .. H01M 2/028; H01M 2/0285; H01M 2/0287
See application file for complete search history.

(56) References Cited

U.S. PATENT DOCUMENTS

| | | | |
|---|---|---|---|
| 2004/0086779 A1 | 5/2004 | Higley et al. | |
| 2008/0172566 A1 | 7/2008 | Park | |
| 2010/0216016 A1* | 8/2010 | Seino ................... | H01M 2/021 429/185 |
| 2010/0227205 A1 | 9/2010 | Byun et al. | |

FOREIGN PATENT DOCUMENTS

| | | |
|---|---|---|
| CN | 2727978 | 9/2005 |
| CN | 102412373 | 4/2012 |
| EP | 2226868 B1 | 10/2011 |
| JP | 2006-134599 | 5/2006 |

* cited by examiner

*Primary Examiner* — Jane Rhee
(74) *Attorney, Agent, or Firm* — CKC & Partners Co., Ltd.

(57) ABSTRACT

A battery module with a battery housing includes a first conducting layer, at least one battery cell, a second conducting layer, an insulating layer, and a detecting circuit. The first conducting layer is disposed inside the battery housing. The battery cell is disposed inside the battery housing and opposite to the first conducting layer. The second conducting layer is disposed on the battery cell. The insulating layer is disposed between the first conducting layer and the second conducting layer. The first conducting layer, the second conducting layer, and the insulating layer form an internal capacitor. The detecting circuit is electrically connected with the first conducting layer and the second conducting layer for detecting a capacitance value of the internal capacitor.

9 Claims, 6 Drawing Sheets

BATTERY MODULE AND DETECTING METHOD THEREOF

CROSS-REFERENCE TO RELATED APPLICATION

This application claims the priority benefit of Taiwan application serial No. filed on Dec. 12, 2012. The entirety of the above-mentioned patent application is hereby incorporated by reference herein and made a part of specification.

BACKGROUND OF THE INVENTION

1. Field of the Invention

The disclosure relates to a battery module and, more particularly, to a battery module with an internal capacitor.

2. Description of the Related Art

As lithium ion batteries have high-energy density, safety issue gets more and more attention when the lithium ion batteries are applied in electronic devices. A lithium ion battery usually includes several battery cells, a battery housing covers thereon, electrolyte is injected into the battery housing, and then it is evacuated and sealed. However, a short circuit, high temperature, and corrosion may decompose the electrolyte of the battery, and some problems may occur, which even cause swelling and increase the risk of explosion of the battery.

Consequently, piezoelectric elements are usually disposed in the lithium ion battery. When the lithium ion battery swells, the piezoelectric elements are stressed to generate a voltage to determine whether the lithium ion battery swells.

BRIEF SUMMARY OF THE INVENTION

A battery module with a battery housing is provided. The battery module includes a first conducting layer, at least one battery cell, a second conducting layer, an insulating layer, and a detecting circuit. The first conducting layer is disposed inside the battery housing. The battery cell is disposed inside the battery housing and opposite to the first conducting layer. The second conducting layer is disposed on the battery cell. The insulating layer is disposed between the first conducting layer and the second conducting layer. The first conducting layer, the second conducting layer, and the insulating layer form an internal capacitor. The detecting circuit is electrically connected with the first conducting layer and the second conducting layer for detecting a capacitance value of the internal capacitor.

A detecting method applied in the battery module is also provided. The battery module includes a first conducting layer, a second conducting layer, an insulating layer, and at least one battery cell, the second conducting layer is disposed at the battery cell. The insulating layer is disposed between the first conducting layer and the second conducting layer. The first conducting layer, the second conducting layer, and the insulating layer form an internal capacitor. The internal capacitor has a first capacitance value which is predetermined. The detecting method includes the following steps: detecting a second capacitance value of the internal capacitor when at least one battery cell swells; determining whether the second capacitance value is larger than the first capacitance value; and outputting an alarming signal when the second capacitance value is larger than the first capacitance value and a difference between the second capacitance value and the first capacitance value is larger than a predetermined critical capacitance value.

According to the embodiments, an abnormal situation of the battery module can be detected instantly, and then users can replace the battery module in time. As a result, the abnormal situation of the battery module would not be more serious to further damage an electronic device with the battery module or affects safety. Furthermore, according to the battery module in the embodiments, when the abnormal situation is detected, an alarming signal may be generated to inform users to replace the battery module before the battery is damaged, and then the electronic device would not operate abnormally due to the damage of the battery.

These and other features, aspects and advantages of the present disclosure will become better understood with regard to the following description, appended claims, and accompanying drawings.

DETAILED DESCRIPTION OF THE EMBODIMENTS

"The first", "the second", and etc. are not used to limit the sequence, and they are just used for distinguishing elements or operations described by the same term.

The word "coupled" or "connect" is used for representing that two or more elements are directly physically contacted or electrically connected with each other, or two or more elements are indirectly physically contacted or electrically connected with each other, or two or more elements operates with each other.

Figure 1:
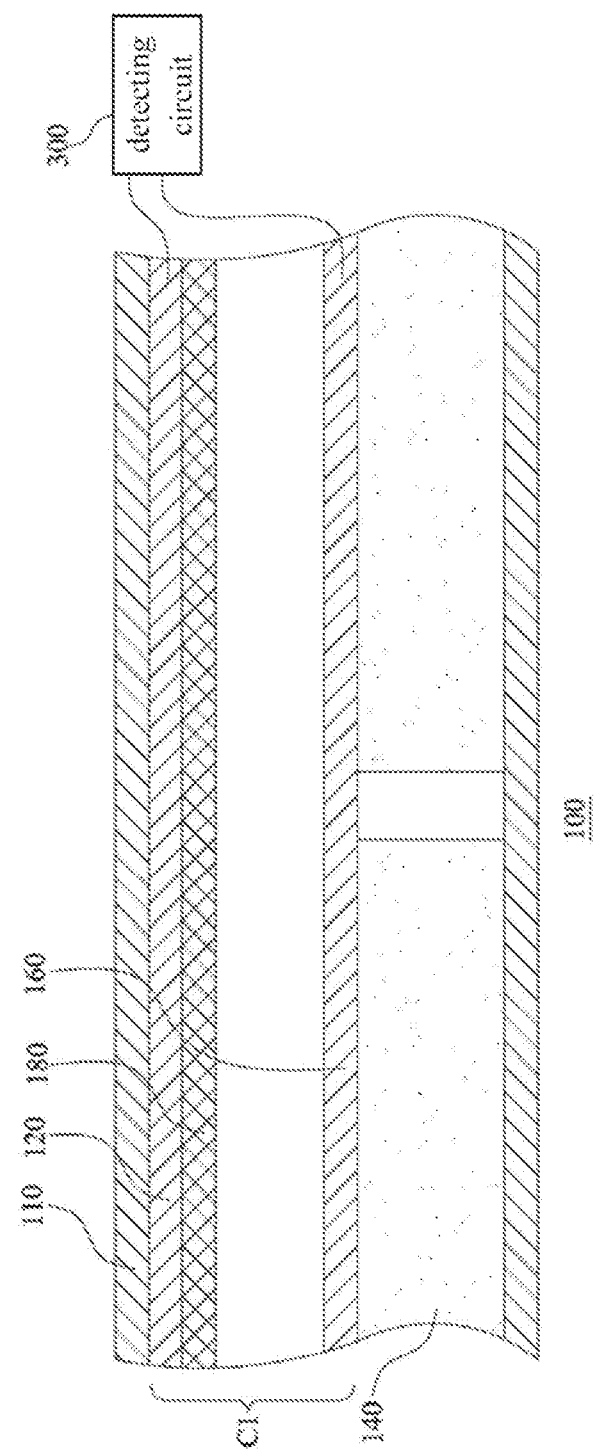
FIG. 1 is a schematic diagram showing a battery module with a battery housing in an embodiment.

FIG. 1 is a schematic diagram showing a battery module with a battery housing in an embodiment. The battery module 100 includes a battery housing 110, a first conducting layer 120, a battery cell 140, a second conducting layer 160, an insulating layer 180, and a detecting circuit 300.

The first conducting layer 120 and the second conducting layer 160 are disposed in the battery housing 110. The insulating layer 180 is disposed between the first conducting layer 120 and the second conducting layer 160. The insulating layer 180 may be disposed at a surface of the first conducting layer 120 or a surface of the second conducting layer 160, and an internal capacitor is formed by the first conducting layer 120, the second conducting layer 160, and the insulating layer 180 (please refer to the capacitor Cin in FIG. 3). In the embodiment, the insulating layer 180 is disposed at the surface of the first conducting layer 120, which is not limited herein. The detecting circuit 300 is electrically connected with the first conducting layer 120 and the second conducting layer 160 for detecting a capacitance value of the internal capacitor.

Figure 2:
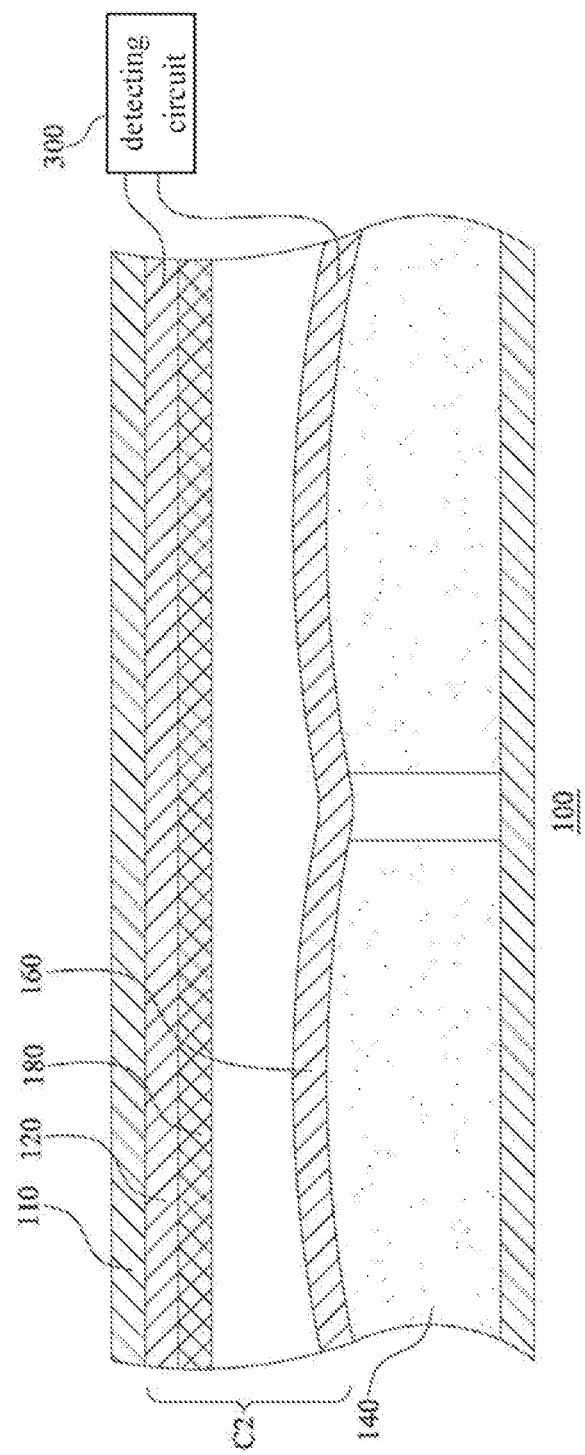
FIG. 2 is a schematic diagram showing the battery module in FIG. 1 when the battery cell changes.

FIG. 2 is a schematic diagram showing the battery module in FIG. 1 when the battery cell swells. When the battery cell 140 swells, the capacitance value detected by the detecting circuit 300 may change from a first capacitance value C1, when the battery cell does not swell (in FIG. 1), to a second capacitance value C2, when the battery cell swells.

Figure 3:
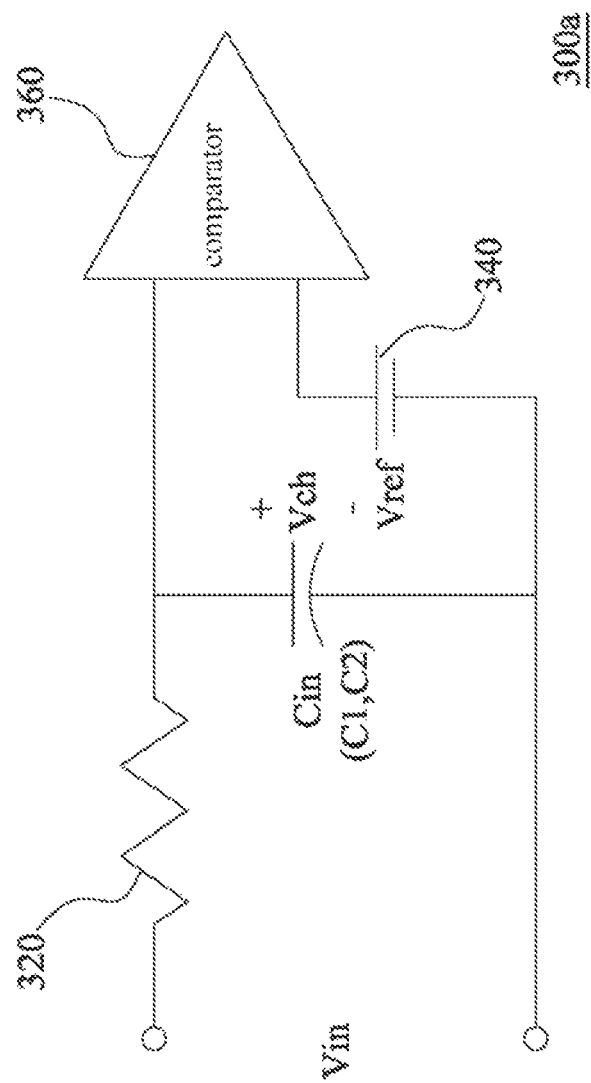
FIG. 3 is a schematic diagram showing a detecting circuit in an embodiment.

FIG. 3 is a schematic diagram showing a detecting circuit in an embodiment. A detecting circuit 300a may be applied in the battery module 100 in FIG. 1, which is not limited herein. The detecting circuit 300a includes a resistor 320, a reference voltage 340, and a comparator 360, which is not limited herein. An input end of the comparator 360 is coupled with the resistor 320 and the internal capacitor Cin, and the other input end is coupled with the reference voltage 340. The input voltage Vin charges the internal capacitor Cin to a charging voltage Vch. The comparator 360 is used to compare the reference voltage Vref and the charging voltage Vch.

In an embodiment, the first capacitance value C1 in the battery cell 140 without swelling is different from the second capacitance value C2 in the battery cell 140 while swelling (wherein the second capacitance value C2 is larger than the first capacitance value C1). Therefore, when the battery cell 140 swells, the time of that the internal capacitor Cin reaches the charging voltage Vch larger than the reference voltage Vref is longer than the time of that the internal capacitor Cin reaches the charging voltage Vch larger than the reference voltage Vref.

When the battery cell 140 swells, the time for the comparator 360 outputting a corresponding output signal may change along with it. That is, when the capacitance value of the internal capacitor Cin is C1, the time of that the voltage of the output signal of the comparator 360 is changed from the reference voltage Vref to the charging voltage Vch of the internal capacitor Cin is t1; when the capacitance value of the internal capacitor Cin is C2, the time of that the voltage of the output signal of the comparator 360 is changed from the reference voltage Vref to the charging voltage Vch of the internal capacitor Cin is t2, wherein t2 is longer than t1. Consequently, it determines whether the second capacitance value C2 is larger than the first capacitance value C1 according to the time. When a difference between the second capacitance value C2 and the first capacitance value C1 is larger than a predetermined critical capacitance value, the detecting circuit 300a outputs an alarming signal representing that the battery cell 140 of the battery module 100 swells.

Figure 4:
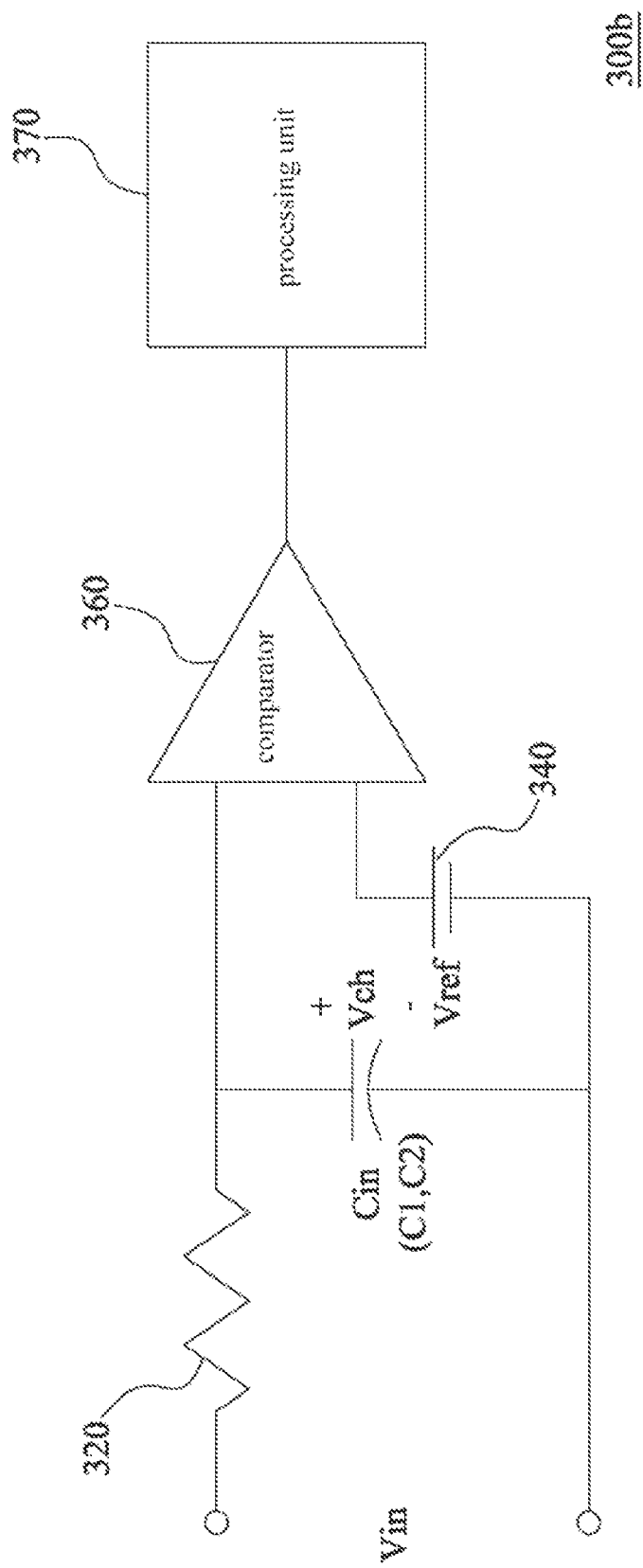
FIG. 4 is a schematic diagram showing a detecting circuit in another embodiment.

FIG. 4 is a schematic diagram showing a detecting circuit in another embodiment. Comparing with detecting circuit 300a, the detecting circuit 300b further includes a processing unit 370. In an embodiment, the internal capacitor Cin is pre-charged to the charging voltage Vch. A first charging time for the internal capacitor Cin with the first capacitance value C1 is t1, and a second charging time for the internal capacitor Cin with the second capacitance value C2 is t2.

The processing unit 370 is electrically connected with the comparator 360 for receiving the output signal from the comparator 360 and calculating the first charging time t1 and the second charging time t2 of the internal capacitor Cin according to the output signal. When the processing unit 370 determines that the second charging time t2 is longer than the first charging time t1, it is represented that the second capacitance value C2 is larger than the first capacitance value C1, when the difference between the first charging time t1 and the second charging time t2 is larger than the predetermined critical capacitance value, the detecting circuit 300b outputs the alarming signal representing that the battery cell 140 swells.

Figure 5:
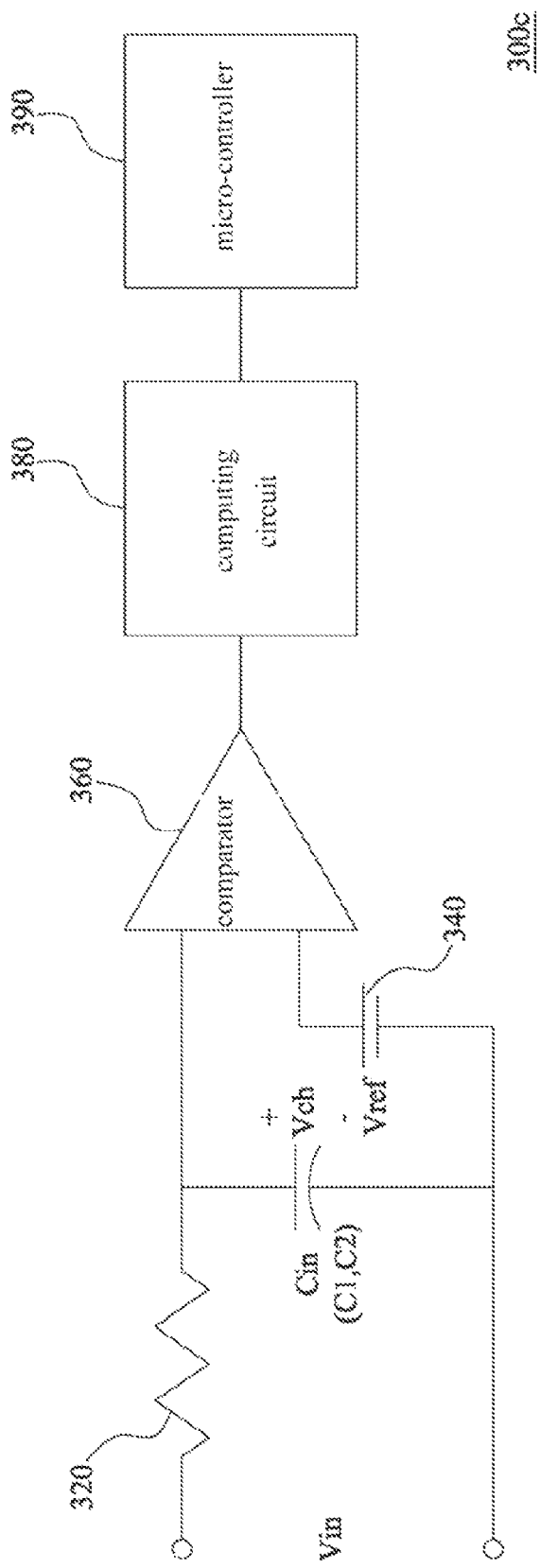
FIG. 5 is a schematic diagram showing a detecting circuit in further another embodiment.

FIG. 5 is a schematic diagram showing a detecting circuit in further another embodiment. Comparing with the detecting circuit 300a in FIG. 3, the detecting circuit 300c further includes a computing circuit 380 and a micro-controller 390. The computing circuit 380 is electrically connected with the comparator 360. The computing circuit 380 is used for receiving a corresponding output signal from the comparator 360 and calculating the charging time of the internal capacitor Cin according to the output signal. That is, when the internal capacitor Cin has the first capacitance value C1, the computing circuit 380 calculates the needed first charging time t1; when the internal capacitor Cin has the second capacitance value C2, the computing circuit 380 calculates the needed second charging time t2. The micro-controller 390 is electrically connected with the computing circuit 380 to determine whether the second charging time t2 is longer than the first charging time t1, and then the detecting circuit 300c can determine whether the second capacitance value C2 is larger than the first capacitance value C1. When the micro-controller 390 determines that the second charging time t2 is longer than the first charging time t1, it represents that the second capacitance value C2 is larger than the first capacitance value C1. When the second capacitance value C2 is larger than the first capacitance value C1 and the difference therebetween is larger than the predetermined critical capacitance value, the detecting circuit 300c outputs the alarming signal representing that the battery cell 140 swells.

The detecting circuits in FIG. 3, FIG. 4, and FIG. 5 are just embodiments and not for limiting the scope of the disclosure. Any detecting circuit or detecting method which can detect the change of the capacitance value is in the scope of the disclosure.

Figure 6:
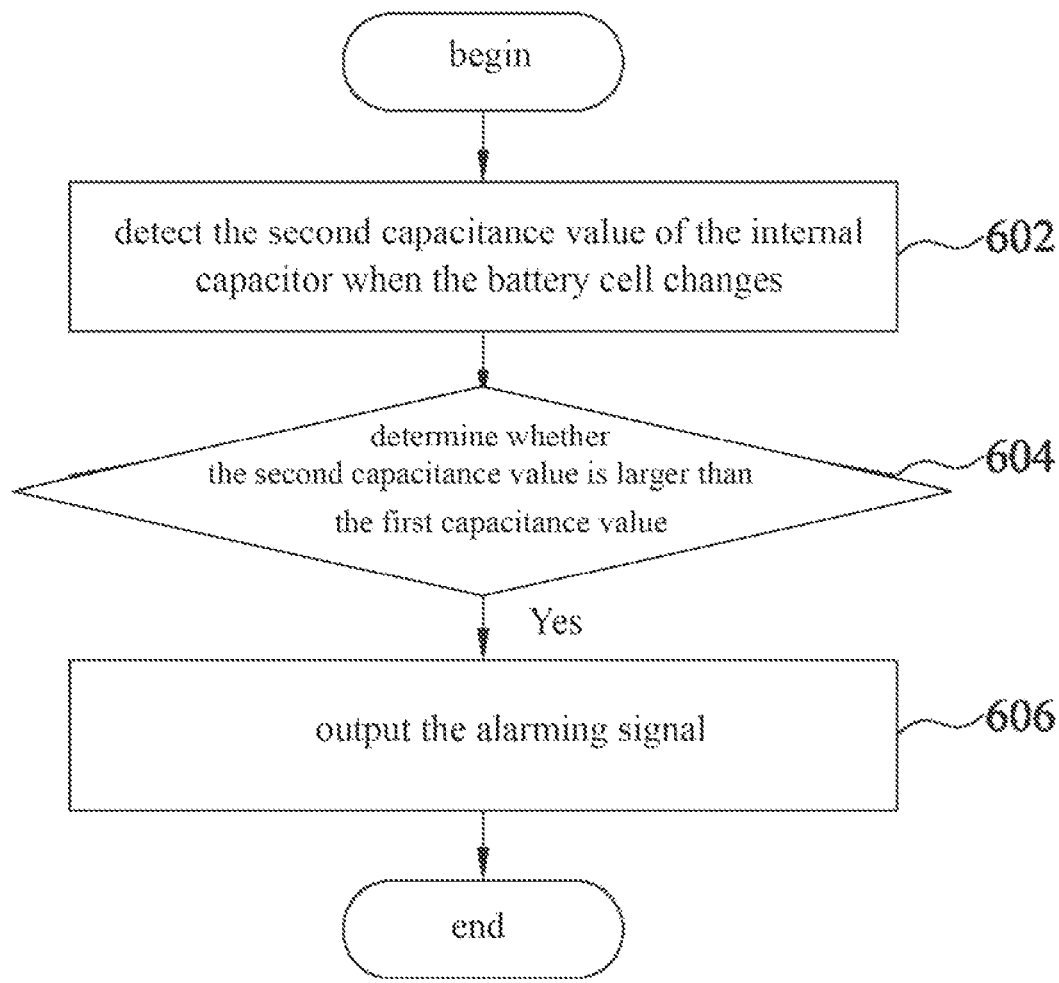
FIG. 6 is a flow chart showing a detecting method applied to a battery module in an embodiment.

FIG. 6 is a flow chart showing a detecting method applied to the battery module in an embodiment. The detecting method may be applied in the battery module 100 in FIG. 1, which is not limited herein. The following description is based on FIG. 1, FIG. 2, and FIG. 6.

In step 602, detecting the second capacitance value C2 of the internal capacitor Cin when the battery cell 140 changes (for example, the battery cell 140 swells in FIG. 2). In step 604, determining whether the second capacitance value C2 is larger than the predetermined first capacitance value C1. In step 606, outputting the alarming signal which represents that the battery cell swells when the second capacitance value C2 is larger than the first capacitance value C1 and the difference between the first capacitance value C1 and the second capacitance value C2 is larger than the predetermined critical capacitance value.

Additionally, the step 604 may further include a step of determining whether the second charging time t2 of the internal capacitor with the second capacitance value C2 is larger than the first charging time t1 of the internal capacitor with the first capacitance value C1. If the second charging time t2 is longer than the first charging time t1, it is determined that the second capacitance value C2 is larger than the first capacitance value C1.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A battery module with a battery housing comprising:
a battery cell disposed inside the battery housing;
a first conducting layer disposed inside the battery housing;
a second conducting layer disposed at a side of the battery cell; and
an insulating layer disposed between the first conducting layer and the second conducting layer, wherein the first conducting layer, the second conducting layer, and the insulating layer form an internal capacitor, the internal capacitor has a first capacitance value when the battery cell does not swell, and the internal capacitor has a second capacitance value when the battery cell swells.

2. The battery module according to claim 1, further comprising a detecting circuit used for detecting a change of the capacitance value of the internal capacitor.

3. The battery module according to claim 2, wherein the detecting circuit further comprises a comparator, an input end of the comparator is coupled with the internal capacitor and an input voltage, and the other input end is coupled with a reference voltage.

4. The battery module according to claim 3, wherein the detecting circuit further comprises a processing unit coupled with an output end of the comparator, the processing unit is used for determining whether the second capacitance value of the internal capacitor is larger than the first capacitance value.

5. The battery module according to claim 4, wherein the processing unit determines whether the second capacitance value is larger than the first capacitance value according to a charging time of the internal capacitor.

6. The battery module according to claim 3, wherein the detecting circuit further comprises:
   an computing circuit coupled with an output end of the comparator; and
   a micro-controller coupled with the computing circuit.

7. The battery module according to claim 6, wherein the computing circuit is used for calculating the charging time of the internal capacitor with the second capacitance value and the charging time of the internal capacitor with the first capacitance value, and the micro-controller is used for determining whether the charging time of the internal capacitor with the second capacitance value is longer than the charging time of the internal capacitor with the first capacitance value.

8. A detecting method of a battery module, wherein the battery module includes a first conducting layer, a second conducting layer, an insulating layer, a battery cell, and a detecting circuit, the first conducting layer, the second conducting layer, and the insulating layer form an internal capacitor and are disposed in the battery cell, when the battery cell does not swell, the internal capacitor has a first capacitance value which is predetermined, the detecting method comprises:
   detecting a second capacitance value of the internal capacitor when the battery cell swells;
   determining whether the second capacitance value is larger than the first capacitance value; and
   outputting an alarming signal when the second capacitance value is larger than the first capacitance value and a difference between the second capacitance value and the first capacitance value is larger than a predetermined critical capacitance value.

9. The detecting method according to claim 8, wherein the step of determining whether the second capacitance value is larger than the first capacitance value comprises:
   determining a second charging time of the internal capacitor with the second capacitance value and a first charging time of the internal capacitor with the first capacitance value; and
   determining that the second capacitance value is larger than the first capacitance value if the second charging time is longer than the first charging time.

* * * * *